US011839915B2

(12) United States Patent
Sparks

(10) Patent No.: US 11,839,915 B2
(45) Date of Patent: *Dec. 12, 2023

(54) SYSTEM AND METHOD FOR DETERMINING BEAM POWER LEVEL ALONG AN ADDITIVE DEPOSITION PATH

(71) Applicant: Product Innovation and Engineering L.L.C., Saint James, MO (US)

(72) Inventor: Todd Eugene Sparks, Rolla, MO (US)

(73) Assignee: Product Innovation and Engineering LLC, St. James, MO (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/153,650

(22) Filed: Jan. 20, 2021

(65) Prior Publication Data

US 2022/0226901 A1    Jul. 21, 2022

(51) Int. Cl.
*B22F 10/366*     (2021.01)
*B22F 12/30*     (2021.01)
(Continued)

(52) U.S. Cl.
CPC .......... *B22F 10/366* (2021.01); *B22F 10/368* (2021.01); *B22F 10/85* (2021.01);
(Continued)

(58) Field of Classification Search
CPC ....... B33Y 30/00; B33Y 50/02; B22F 10/366; B22F 10/85; B22F 12/44; B22F 12/50; B22F 12/30; B22F 10/368
(Continued)

(56) References Cited

U.S. PATENT DOCUMENTS

| 4,817,020 A | 3/1989 | Chande |
| 4,959,244 A | 9/1990 | Penny |

(Continued)

FOREIGN PATENT DOCUMENTS

| DE | 4234339 | 6/2002 |
| DE | 102010015023 | 10/2011 |

(Continued)

OTHER PUBLICATIONS

B. Dutta, Rapid manufacturing and remanufacturing of DoD components using direct metal deposition, Published in: The AMMTIAC Quarterly, vol. 6, No. 2, p. 5.

(Continued)

*Primary Examiner* — Mohammad Ali
*Assistant Examiner* — Joshua T Sanders
(74) *Attorney, Agent, or Firm* — Sandberg Phoenix & von Gontard PC

(57) ABSTRACT

A laser power control method for additive manufacturing includes a pre-processing component and an intra-processing component. The pre-processing component creates in the system controller a machine code expressed additive-path-with-geometry-metadata that includes a path description. The path description represents the path of the beam source on the build and includes a geometry index for the build. The intra-processing component calculates required power for the beam at intervals and events on the beam path based upon the additive-path-with-geometry-metadata and calculations of the energy balance at the melt pool and the total energy for each point P(s) on the path.

17 Claims, 10 Drawing Sheets

(51) Int. Cl.
  *B22F 12/44* (2021.01)
  *B33Y 30/00* (2015.01)
  *B22F 10/85* (2021.01)
  *B22F 12/50* (2021.01)
  *B33Y 50/02* (2015.01)
  *B22F 10/368* (2021.01)

(52) U.S. Cl.
  CPC .............. *B22F 12/30* (2021.01); *B22F 12/44* (2021.01); *B22F 12/50* (2021.01); *B33Y 30/00* (2014.12); *B33Y 50/02* (2014.12)

(58) Field of Classification Search
  USPC ........................................................ 700/119
  See application file for complete search history.

(56) References Cited

U.S. PATENT DOCUMENTS

| | | | |
|---|---|---|---|
| 5,155,329 | A | 10/1992 | Terada |
| 5,247,155 | A | 9/1993 | Steen |
| 5,283,416 | A | 2/1994 | Shirk |
| 5,334,191 | A | 8/1994 | Poppa |
| 5,449,882 | A | 9/1995 | Black |
| 5,517,420 | A | 5/1996 | Kinsman |
| 5,651,903 | A | 7/1997 | Shirk |
| 5,674,415 | A | 10/1997 | Leong |
| 5,854,751 | A | 12/1998 | DiPietro |
| 6,122,564 | A | 9/2000 | Koch |
| 6,188,041 | B1 | 2/2001 | Kim |
| 6,311,099 | B1 | 10/2001 | Knut |
| 6,780,657 | B2 | 8/2004 | Ino |
| 6,809,820 | B2 | 10/2004 | Snelling |
| 6,813,533 | B1 * | 11/2004 | Semak ................ B23K 35/0244 700/118 |
| 6,995,334 | B1 | 2/2006 | Kovacevic |
| 7,186,947 | B2 | 3/2007 | Connally |
| 8,426,770 | B2 | 4/2013 | Pinon |
| 8,777,482 | B2 | 7/2014 | Pfitzner |
| 9,573,224 | B2 * | 2/2017 | Sparks ................ B33Y 10/00 |
| 9,757,902 | B2 | 9/2017 | Sparks et al. |
| 10,632,566 | B2 | 4/2020 | Sparks |
| 2006/0032840 | A1 | 2/2006 | Bagavath-Singh |
| 2006/0249487 | A1 | 11/2006 | Dunias |
| 2007/0179484 | A1 | 8/2007 | Sade |
| 2008/0029495 | A1 * | 2/2008 | Emiljanow ............ B23K 26/32 219/121.61 |
| 2008/0206065 | A1 | 8/2008 | Yamashita et al. |
| 2008/0296270 | A1 | 12/2008 | Song |
| 2009/0206065 | A1 * | 8/2009 | Kruth ................ B23K 26/0342 219/121.65 |
| 2009/0255980 | A1 | 10/2009 | Li |
| 2009/0283501 | A1 | 11/2009 | Erikson |
| 2010/0134628 | A1 | 6/2010 | Pfitzner |
| 2011/0100964 | A1 | 5/2011 | Burbaum |
| 2013/0062324 | A1 | 3/2013 | Dorsch |
| 2013/0066403 | A1 | 3/2013 | Giraud |
| 2013/0168902 | A1 | 7/2013 | Herzog |
| 2013/0319580 | A1 | 12/2013 | Ozbaysal |
| 2014/0034626 | A1 | 2/2014 | Illston |
| 2015/0268099 | A1 | 9/2015 | Craig |
| 2016/0059352 | A1 * | 3/2016 | Sparks ................ B33Y 50/02 219/76.14 |

FOREIGN PATENT DOCUMENTS

| | | |
|---|---|---|
| DE | 102010039442 | 2/2012 |
| EP | 1340583 | 3/2003 |
| EP | 1958584 | 8/2008 |
| EP | 1099184 | 1/2014 |
| EP | 1693141 | 2/2014 |
| WO | WO00/76715 | 12/2000 |

OTHER PUBLICATIONS

S. Cohen, A model for the reflectivity in laser-substrate interactions, Source: Journal of Applied Physics, v 64, n 10, pt 1, 5102-5, Nov. 15, 1988; Country of publication: USA.

Z. Ye, Real-time measure system of molten pool temperature field in laser remanufacturing. Published in: Lasers & Electro Optics & The Pacific Rim Conference on Lasers and Electro-Optics, 2009. CLEO/Pacific RIM '09. Conference on Date of Conference: Aug. 30-3, 2009 pp. 1-2E.

R. Fabbro, Study of keyhole geometry for full penetration Nd-Yag CW laser welding, Published in: Lasers and Electro-Optics Europe, 2005. CLEO/Europe Conference on Date of Conference: Jun. 17-17, 2005 p. 659.

Govardhan, S.M. Real-time welding process control using infrared sensing. Thermal, Mechanical and Multi-Physics Simulation and Experiments in Microelectronics and Microsystems (EuroSimE). 2013 14th International Conference on Apr. 14-17, 2013 pp. 1-5.

Toshinari, O., Measurement of TIG weld pool surface temperature distribution by UV radiation thermometry, Published in: SICE 2002. Proceedings of the 41st SICE Annual Conference (vol. 1) Date of Conference Aug. 5-7, 2002 pp. 39-41 vol. 1.

Dutta, B., Additive manufacturing by direct metal deposition, Published in: Advanced Materials & Processes, Date: May 2011.

Heralic, Monitoring and Control of Robotized Laser Metal-Wire Deposition, Department of Engineering Science University West, Trolihattan, Sweden, 2012.

Craeghs, Online Quality Control of Selective Laser Melting, Katholieke Universiteit Leuven, Department of Mechanical Engineering, Celestijnenlaan 300B, 3001 Haverlee (Belgium) 2011.

Barua, Development of a Low Cost Imaging System for a Laser Metal Deposition Process, Department of Mechanical Engineering, Missouri University of Science and Technology.

* cited by examiner

Deposition path for a cylindrical structure

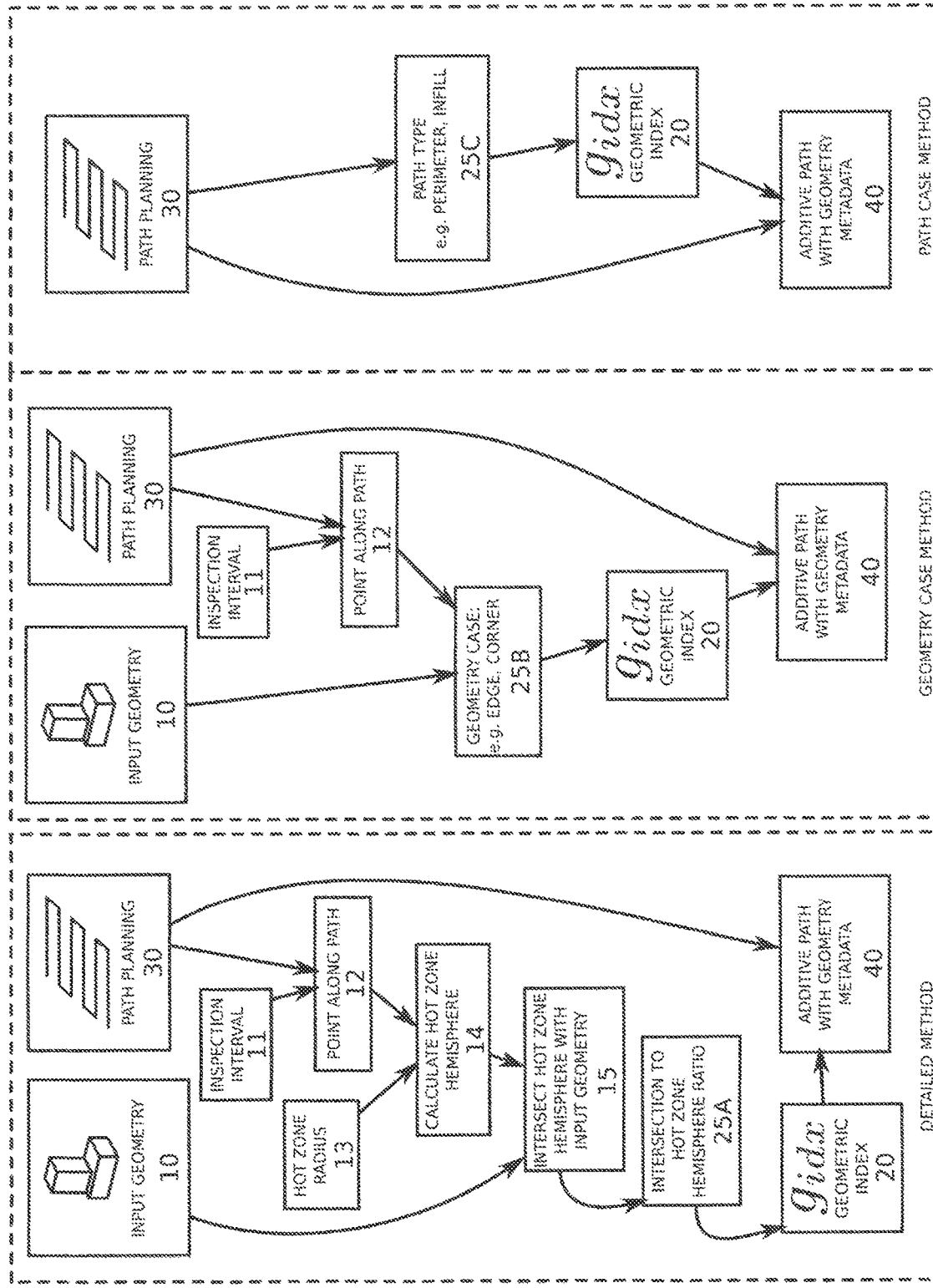

SYSTEM AND METHOD FOR DETERMINING BEAM POWER LEVEL ALONG AN ADDITIVE DEPOSITION PATH

STATEMENT REGARDING FEDERALLY SPONSORED RESEARCH OR DEVELOPMENT

This invention was made with the support of the U.S. government under Contract Number N6833518603 awarded by the Naval Air Warfare Center, Aircraft Division. The U.S. government may have certain rights in this invention.

CROSS REFERENCE TO RELATED APPLICATION

Not applicable.

SEQUENCE LISTING, TABLE OR COMPUTER PROGRAM ON COMPACT DISC

Not applicable.

FIELD OF INVENTION

This invention relates to additive metal layering techniques using an emitted energy source.

BACKGROUND OF THE INVENTION

Additive metal deposition is an industrial technique that builds fully-dense structures by melting powdered or wire metal, via a laser or other energy source, into solidifying beads, which are deposited side by side and layer upon layer upon a work piece substrate. It is known to utilize the process to repair and rebuild a worn or damaged component using a laser to build up structure on the component. The process is particularly useful to add features such as bosses or flanges on subcomponents of fabricated structures. The basic process involves adding layers to the component to create a surface feature on the component via the introduction of depositing material (delivered in the form of injected powder or a wire) into a laser beam. The additive process is known by several names including "laser cladding," "laser metal deposition," "direct metal deposition" or "additive metal layering."

Additive metal layering is typically performed by using a computer aided design ("CAD") to map the geometry of a part and then depositing metal, layer-by-layer, on the part. The CAD mapped geometry is input into a computer controlled (robotic) part handler that can manipulate the part in multiple axes of movement during the deposition process. In all of these techniques, a heat source (typically an industrial laser beam) is used to create a melt pool into which a wire or powdered feedstock is fed in order to create beads upon solidification. In practice, the heat source is under computer numerical control and is focused onto a workpiece, producing the melt pool. A small amount of powder or wire metal is introduced into the melt pool, building up the part in a thin layer. The beam follows a previously determined toolpath. The toolpath is generated based on the CAD data that computes the needed part layer by layer. The beads are created by means of relative motion of the melt pool and the substrate, for example, using an industrial robot arm or an XY-table. A part is then built by depositing the beads side by side and layer upon layer. The most popular approach combines a high power laser heat source with metal powder as the additive material.

Careful tuning of the deposition tool and parameters, such as the powder or wire feed rate, the energy input, and the traverse speed are therefore important in order to obtain layers, which are free from defects such as shape irregularities, lack-of-fusion or cracks. Droplet forming, namely, globular transfer of the molten metal, is also a common disturbance that affects the geometrical profile of the deposited beads and stability of the additive layers.

Regulating the necessary needed power is critical to system operation and achieving a high-quality layered end product. The currently known laser additive processes attempt to address deposition quality issues in either of two ways. In this respect, the prior laser additive processes use a constant laser power or one regulated by a feedback (a/k/a "closed-loop") sensor.

The issue with using a constant laser power is that the operator has to optimize the power level for a worst case scenario, typically the start of the process. This results in variations in both geometry and material properties as the melt pool size and temperature gradients vary with the local energy balance conditions around the melt pool. Using a constant energy throughout the deposition process is problematic because the additive process changes the geometry of the built structure during the process. Hence, the chosen constant power level represents a compromise selection.

Feedback systems represent an attempt to address the deficits of the constant power system. The typical prior art feedback systems attempt to control the deposition process by monitoring the dimensions of the part or the melt pool during the deposition process. Feedback or closed-loop systems are inherently reactionary, and thus can only react to conditions that have already drifted away from nominal.

To address the deficits in feedback systems in regulating laser power during the additive process, applicant proposed an inventive solution that used calculated predictive levels of laser power needed during the additive layering process as an input into the laser power controller to regulate laser power at intervals during the additive path deposition process. This solution is detailed in U.S. Pat. No. 9,573,224. According to the method of that patent, optimum beam power could be calculated for any point P(s) along an additive path that will be traveled to form a build that has a geometry and is formed from deposited material added to a substrate. The described method utilized a calculated idealized geometry for each point P(s) along the additive path. The idealized geometry for each point P(s) comprises a melt pool, hot zone and bulk portion.

The method of U.S. Pat. No. 9,573,224 predicted energy needs along the additive path based upon the dynamic geometry and thermodynamics of the build during the additive process. The power prediction method used four essential components to create a simplified thermodynamic model of the structure and build environment during processing that would predict needed power during the deposition process. The four components include: a) an additive path describing the path of the laser through space; b) a geometric representation of the geometry that the additive path is intended to create; c) a description of the thermodynamic characteristics of the manufacturing environment; and d) the thermophysical characteristics of the materials involved.

The process described in U.S. Pat. No. 9,573,224 calculated input laser power at definable intervals along a laser path by using the path and geometric representation of the part being produced to create an idealized geometry that allowed for tenable calculations. With that predictive method, laser power for a particular build is determined by the position of the laser along the path s. With an entirely predictive method, where power is computed before the production process, the predictive algorithm must accurately model everything about the process. This is very difficult to do because during the build process, there are often many "wait-until" events that inject delays in the process and thus machine control. In addition, operator-instigated control measures, such as overriding speed determinations and pausing the build process, cause deviations in predicted values and real-world values.

By way of practical explanation, with the previous method, it was seen that the pre-computed power plan cannot recover from conditions where machine timing does not match the model of the machine used in the plan ling system. This can result in static offsets in event timing. For example, some relays takes 25 ms to close, not 12 ms. The static offset may also occur on a scaled time basis, such as by virtue of the operator adjusting the machine speed override settings. (It is not uncommon for an operator to do so when correcting for an incorrect initial setting that pertains to material feed.) In some cases a massive deviation from the modeled process and the actual process occurs by virtue of the operator pausing the machine. An operator may need to pause the build process, for example, to switch bottles of Argon gas needed to maintain the inert build atmosphere or to refill the feed system. Basically, the errors that accumulate in timing will directly affect the estimates for enthalpy. As these errors accumulate, the predicted power becomes increasingly incorrect over time. Thus, Applicant has determined that laser power levels along a path s for a particular additive manufacturing build can be better predicted when the laser input power is controlled as an event-driven and time interval system as opposed to a purely position-based system.

SUMMARY OF THE INVENTION

The instant invention improves upon the prior art laser power prediction method, by changing the prediction method from a position-based system to an event-driven system. As opposed to the method disclosed in U.S. Pat. No. 9,573,224, the method disclosed herein utilizes two sequentially separate, but interrelated processes—with the intra-processing step dependent upon the pre-processing step. In general terms, the present invention departs from, but improves upon, the prior predictive laser power control technique by making the laser power predictions more timely. In this respect, if the power plan for the additive manufacturing process is purely pre-computed by position modeling only, then there is no capacity for the system to understand the current actual state of system. As described herein, with the current invention, the first processing step is a pre-processing step that assigns connectivity information to the path for later use. This connectivity information is encoded in the path plan data which is configured as machine code in the system controller. The second processing step is a programmed, on-machine process that computes laser powers as they are required. These computations are performed at event-driven intervals (for example, the laser turns on or off) and at a pre-determined rate (time interval). In tests, rates with frequencies of 0.2-100 Hz demonstrated good build structure.

When the method of the present invention is implemented, during the additive manufacturing process the CNC machine executes the motion code (a/k/a machine code) configured on the system controller. Each block of motion code contains a header expressing the intent of the motion code. That intent is passed to the additive manufacturing controller, which interprets what that means for all of the additional equipment attached to the machine. This arrangement yields several computational resources attached to hardware that shares a network with the CNC machine. This control architecture when implemented with a power prediction method means that live laser power corrections can be made when implementing feedback controls.

With reference to the equation variables discussed herein infra and in U.S. Pat. No. 9,573,224, the additive manufacturing system during the intra-processing component of the method sends a signal to the predictive software for when the additive process begins and ends. It is the timing of these signals that drives the computation of $\Delta t$ and $i_p$. In contrast to the previously described method, the present invention method does not attempt to predict a great distance into the future. It keeps a running model alongside the actual build process, taking data from the additive manufacturing system as events occur in real-time. Predictions are made for what power would be acceptable for a small amount of time.

Two modes of event-driven operation have been used so far. The first mode is a system-triggered mode in which the power calculation is triggered by a laser "on" event that predicts an acceptable laser power value to use until the next laser "off" event (that is, best static values for now). The laser power computed at the beginning of each laser "on" event is based in part on a simulation of the cooling process that occurred since the laser "off" event. The intra-processing component ode works in a system in which as long as the laser is "on," it continuously predicts laser power values at a predetermined rate while the laser is active. These predictions would occur as continuous updates based upon processing speed.

Those skilled in the art would assume that a control system based upon simulation would be inherently much slower than a real-time feedback system. However, the present-invention modeling method proves that assumption wrong and beneficially distills the prediction process to just what is necessary to produce useful predictions. By running the system on the additive system controller, stability is improved both by making use of more timely data and by attempting to predict less into the future than with the prior art predictive method. Using the process disclosed herein, improved calculated predictive levels can be input into the laser power controller to regulate laser power at intervals during the additive path deposition process.

BRIEF DESCRIPTION OF THE DRAWINGS

FIGS. 6A-6C depict three alternative methods of determining the additive-path-with-geometry-metadata as part of the first (pre-processing) component of the overall method for controlling beam power according to the present invention predictive technique.

DETAILED DESCRIPTION

Figure 1:
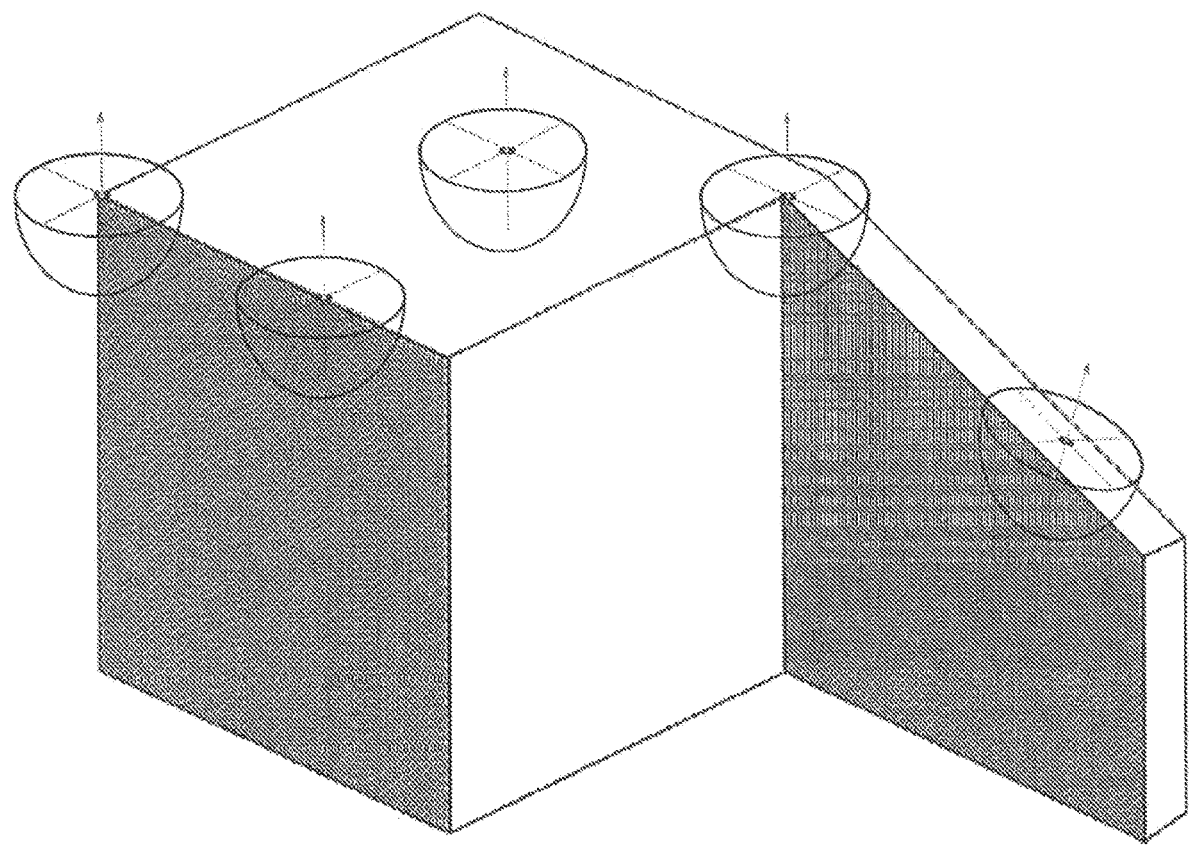
FIG. 1 is a diagram showing the hemisphere oriented technique used to estimate hot zone shape and connectivity of the bulk of the workpiece structure.

The present invention is directed to a laser power prediction method. The method utilizes the following items to create an improved thermodynamic model of the work piece to compute needed laser power at intervals during the additive process. Like the method of the U.S. Pat. No. 9,573,224, the method described herein does so using: a) an additive path describing the path of the laser through space; b) a geometric representation of the geometry that the additive path is intended to create; c) a description of the thermodynamic characteristics of the manufacturing environment; and d) computed thermophysical characteristics of the materials involved. However, the method does so in a two-part process.

The first processing step is a pre-processing step that assigns connectivity information to the path for later use. This connectivity information is encoded in the path plan data (namely, the additive-path-with-geometry-metadata). Of note, the determined model of the thermodynamic characteristics of the build is used to predict an appropriate input laser power at definable intervals along the laser path. It accomplishes this by using the path and geometric representation of the part being produced to create a geometry index (a/k/a an idealized geometry) that allows for tenable calculations. However, whereas in the previous method the geometry index was an intermediary value derived at the computer-aided manufacturing ("CAM") level (i.e., it was continuously being sampled from CAD data), the geometry index is now provided in the machine code from the CAM solution. The geometry index therefore resides as part of the additive manufacturing system instructions (e.g., g-code for a CNC machine) instead of being part of the CAM post-processor action to compute output power. This allows for the system controller to update the output power as needed, rather than expressly follow a predetermined power schedule. The end result is a laser power that is more responsive to the actual activities of the additive manufacturing system. The power update rate is not limitedly tied to the verbosity of the expression in the additive manufacturing system instructions, but rather is a result of the calculations on the laser power prediction control system, which use cues generated from events on the additive manufacturing system to create accurate timing. In particular, when used with a feedback sensor to estimate hot zone enthalpy, corrections to input laser power level can be made much more quickly than with the prior art method. The faster correcting of input laser power level results in a more stable build.

The second processing step is an on-machine process that computes laser powers as they are required. These computations are performed at event-driven and time driven intervals. In this respect the prediction system receives laser "on" and "off" events from the system executing the additive path. A laser power is computed at a laser "on" event after simulating the cooling process that occurred since the laser "off" event. In terms of time-driven events, laser power is recomputed at a set rate during the period the laser is active.

A workpiece undergoing additive laser deposition includes various regions that respond to input beam energy. These regions are utilized to create an idealized geometry for a thermodynamic model for the article being built. The workpiece subject to laser impact comprises:
 a. A molten puddle (melt pool);
 b. A region of hot material in direct contact with the molten puddle (hot zone); and
 c. A mass representing the substrate material and part geometry not represented by the other two regions (bulk).

The laser power input is calculated by performing an energy balance calculation at intervals along the laser's path with the following considerations:
 1. Conduction from the melt pool to the hot zone;
 2. Conduction from the hot zone to the bulk of the particular workpiece;
 3. Conduction from the bulk of the part to the damping system of the CNC machine;
 4. Radiation from the melt pool;
 5. Radiation from the hot zone;
 6. Convection from the melt pool;
 7. Convection from the hot zone;
 8. Convection from the bulk structure;
 9. Process activity at the current point (i.e. is the laser supposed to be on now or not?);
 10. Mass of the hot zone; and
 11. Area for conduction between the hot zone and bulk structure.

Relevant to describing and demonstrating the inventive method are the following elements and symbols, which have the meanings indicated.

Material Properties
 Specific heat, $C_p$
 Thermal conductivity, k
 Density, $\rho$
 Laser absorption coefficient, $\alpha$
 Liquidus temperature, $T_l$
 Emissivity, $\epsilon$
 heat of fusion, $H_f$ Machine Parameters
 Maximum laser power, $Q_{max}$
 Ambient temperature, $T\infty$
 Machine temperature, $T_{mach}$
 Area for part→machine heat transfer, $A_{mach}$
 Powder supply temperature, $T_p$
 Convection coefficient for the machine environment, h Deposition Parameters
Layer thickness, $d_l$
  track width, w
  Remelt thickness as a fraction of layer thickness, r
  Scan speed, f
  Substrate mass, $m_{sub}$
  Target superheat, $T_{super}$
Laser Predictive Power Settings
  Target hot zone radius, $r_{hot}$
  Target melt pool temperature, $T_{melt}=T_l+T_{super}$
  Target hot zone temperature, $T_{target}$
  Laser power prediction interval, $i_p$
Nomenclature
  Let s describe the length along the deposition path.
  Let P describe the deposition path such that P(s) is the Cartesian coordinate of a point s along the path.
  Let $\hat{t}(s)$ describe the tool axis direction at a distance of s along the path.
  Let G describe the deposition geometry.
  Let Z (r, p, n̂) describe a hemisphere of radius r with the circular surface centered at point p with a normal direction of n̂.

An exemplary calculation method thus proceeds as follows. First, before beginning the formal calculations representing the in-process thermodynamic environment, initial values are input into the data structures.

The initial energy content of the build is expressed in Equation 1:

$$H_{build}=C_p T_{amb} m_{sub} \quad (1)$$

The initial build mass is assumed to be the equivalent to the substrate, as expressed in Equation 2:

$$m_{build}=m_{sub} \quad (2)$$

The initial temperature of the build is expressed as follows:

$$T_{build}=T_\infty \quad (3)$$

The initial temperature of the hot zone temperature is expressed in Equation 4:

$$T_{hot}=T_{build} \quad (4)$$

The distance along the path is initialized at 0 in Equation 5:

$$s=0 \quad (5)$$

It is useful to pre-compute items that will remain constant throughout the computation, Maximum volume of the hot zone is calculated as such:

$$V_{max}=\tfrac{2}{3}r_{hot}^3 \pi \quad (6)$$

The maximum hot zone area is calculated in Equation 7 as:

$$A_{max}=2r_{hot}^2 \pi \quad (7)$$

The surface area of the melt pool can be expressed as:

$$A_{melt}=\tfrac{1}{4}w^2 \pi \quad (8)$$

While mass per unit length of the additive path is expressed in Equation 9 as:

$$m_{ul}=wdl\rho \quad (9)$$

The time interval needed to travel one inspection interval along the additive path is computed via the following equation:

$$\Delta t=i_p/f \quad (10)$$

With the above initial pre-calculation steps undertaken, one can proceed to calculate needed laser power along a given deposition path according to the following method.

A. Calculate the geometry index for the current position.

$$V_{hot}=G \cap Z(r_{hot},P(s),\hat{t}(s)) \quad (11)$$

$$A_{hot}=V_{hot}A_{max}/V_{max} \quad (12)$$

Equation 12 can be simplified using the geometry index to:

$$A_{hot}=A_{max}*g_{idx}$$

B. Compute the rate of heat transfer from the melt pool. Note that equations 13-15 refer to a time period, Δt. In the on-machine predictive system discussed herein, Δt is defined as the elapsed time since the last event triggering the prediction system.

1. Energy transferred via conduction from the melt pool:

$$H_{cond}=kA_{hot}/r_{hot}(T_{melt}-T_{hot})\Delta t \quad (13)$$

2. Energy lost due to convection from the melt pool:

$$H_{conv}=hA_{melt}(T_{melt}-T_{hot})\Delta t \quad (14)$$

3. Energy released by the melt pool via radiation:

$$H_{rad}=\epsilon \sigma A_{melt}(T^4_{melt}-T^4_{hot})\Delta t \quad (15)$$

C. Compute an amount of energy needed to bring incoming material and remelted material up to the desired melt pool temperature. Note that the following equations refer to a prediction interval $i_p$. In the disclosed invention $i_p$ is defined as the distance traveled since the last event triggering the prediction system.

1. Energy required to melt the powder:

$$H_{powder}=m_{ul}i_p((T_{melt}-T_p)C_p+H_f) \quad (16)$$

2. Energy required to remelt the existing material:

$$H_{remelt}=m_{ul}i_p r((T_{melt}-T_{hot})C_p+H_f) \quad (17)$$

3 By summing the energy losses at the melt pool and the energy needed to melt material one can calculate a total input energy at this step used to estimate a viable laser power as follows:

$$H_{total}=H_{powder}+H_{remelt}+H_{rad}+H_{cond}+H_{conv} \quad (18)$$

4. Calculate a viable laser power:

$$Q_{laser}=\min(Q_{max},H_{total}/\alpha \Delta t) \quad (19)$$

The expression in Equation 19 is constrained by the output capacity of the laser system employed.

D. The mass of the build is now updated to include the newly deposited material.

$$m_{build}=m_{build}+m_{ul}i_p \quad (20)$$

E. Calculate the energy losses at the build.

1 If accurate model data is not readily available at computation time, an effective radius and area of the build for the purposes of heat transfer calculations can be estimated via Equations 21 and 22.

$$r_{build}=3\sqrt[3]{3m_{build}/\rho 4\pi} \quad (21)$$

$$A_{build}=4r_{build}^2 \pi \quad (22)$$

Next significant losses to the environment from the hot zone, the build, and the machine are estimated in Equations 23, 24 and 25.

2 Energy radiated from the hot zone:

$$H_{hot} = \epsilon \sigma A_{hot}(T^4_{hot} - T^4_\infty) \Delta t \qquad (23)$$

3. Energy conducted from the build to the machine:

$$H_{mach} = (kA^{machine}/r_{build})(T_{build} - T_{mach})\Delta t \qquad (24)$$

4. Energy lost due to convection to the machine environment:

$$H_{env} = hA_{build}(T_{build} - T_\infty)\Delta t \qquad (25)$$

F. Update enthalpy (internal energy) of the build.

$$H_{build} = H_{build} + Q_{laser}\Delta t - H_{mach} - H_{hot} - H_{env} \qquad (26)$$

G. Update (recompute) the build temperature.

$$T_{build}/ = H_{build}/C_p \qquad (27)$$

H. The hot zone temperature estimate is then recomputed in Equation 28. The tuning parameter is used to scale how quickly the hot zone temperature estimate scales with increasing build temperature. In practice, a value of 0.5 was sufficient to provide reasonable results.

$$T_{hot} = fT_{build} + (1-f)T_{target} \qquad (28)$$

I. In Equation 29 the position along the deposition path is updated. Note, however, that in using the on-machine predictive system of the present invention, the position along the path s, is determined by the motion system. The predictive system is event-driven rather than position-driven. The additive manufacturing system sends a signal to the predictive software for when the additive process begins and ends. It is the timing of these signals that drives the computation of $\Delta t$ and $i_p$.

$$s = s + i_p \qquad (29)$$

J. If the path is not complete, return to step 1.

FIG. 1 shows the "hemisphere" hot zone size estimation of various points on a build. Here, the hot zone estimation is referred to herein as a "geometry index." In the method of the prior art patent, the geometry index was used wholly within the CAM system as part of the preparatory step to embed output power into the additive manufacturing system instructions. In contrast, in the method disclosed herein, the pre-computation i.e., preparatory) steps end with the geometry index. The geometry index is a normalized, composite term, defined at any point along the additive path as the ratio of the ratio of the volume of the intersection of the ideal hot zone geometry with the part geometry, divided by the ideal hot zone volume. Thus, a value of 1 would indicate the case of a semi-infinite plate, while a smaller value such as 0.1 would suggest a less connected condition, such as a thin wall or rib. From a human standpoint, it is a more natural thing to consider when working with the prediction system. Essentially, it says how well the particular hot zone region under consideration is connected to the bulk structure in terms proportion. So a value of 0 means it is not connected at all (i.e. some fictitious hot zone alone in its own universe), a 1 means it is fully connected (i.e. the hot zone lies on an infinite flat plate). This does not change the model mathematically, but it simplifies its execution and makes it more intuitive. The geometry index is computed as:

$$g_{idx} = GZ(r,p,\hat{n})/V_{max}$$

Figure 2A:
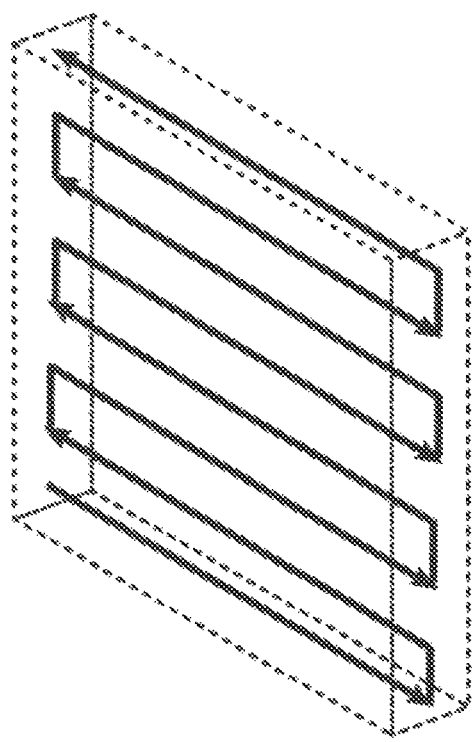
FIG. 2A depicts a simplified deposition path utilized when building a wall-shaped structure using additive laser deposition.
Figure 2B:
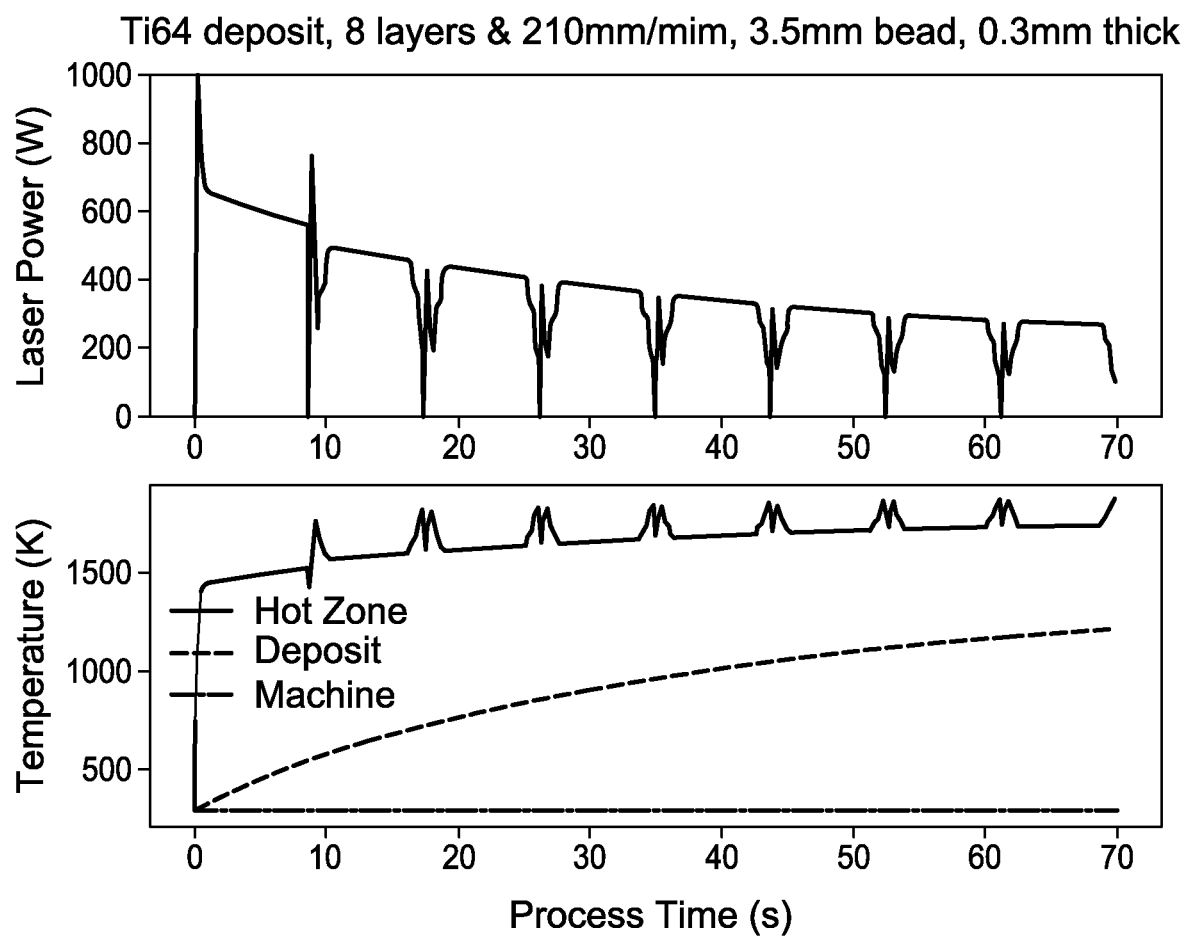
FIG. 2B depicts juxtaposed graphs showing predicted needed laser power and temperatures of the hot zone, deposit and machine environment over time for an additive metal deposition process used to build the wall structure of FIG. 2A when determined according to the prior art predictive method.

FIG. 2A depicts a simplified deposition path utilized when building a wall-shaped structure using additive laser deposition. FIG. 2B depicts juxtaposed graphs showing predicted needed laser power and temperatures of the hot zone, deposit and machine environment over time for an additive metal deposition process used to build the wall structure of FIG. 2A when determined according to the prior art predictive method. The periodicity of the predicted laser power shown in FIG. 2B is due to the laser reaching the corners of the wall structure, which reduces the area available for heat transfer away from the melt pool, resulting in less required laser power to maintain the desired energy balance. The predicted needed laser power is calculated at various intervals along the additive path process according to the prior art calculation technique. The computer controlling the laser power can be programmed to adjust laser power along the deposition path in accordance with the predicted levels of needed energy.

Figure 2C:
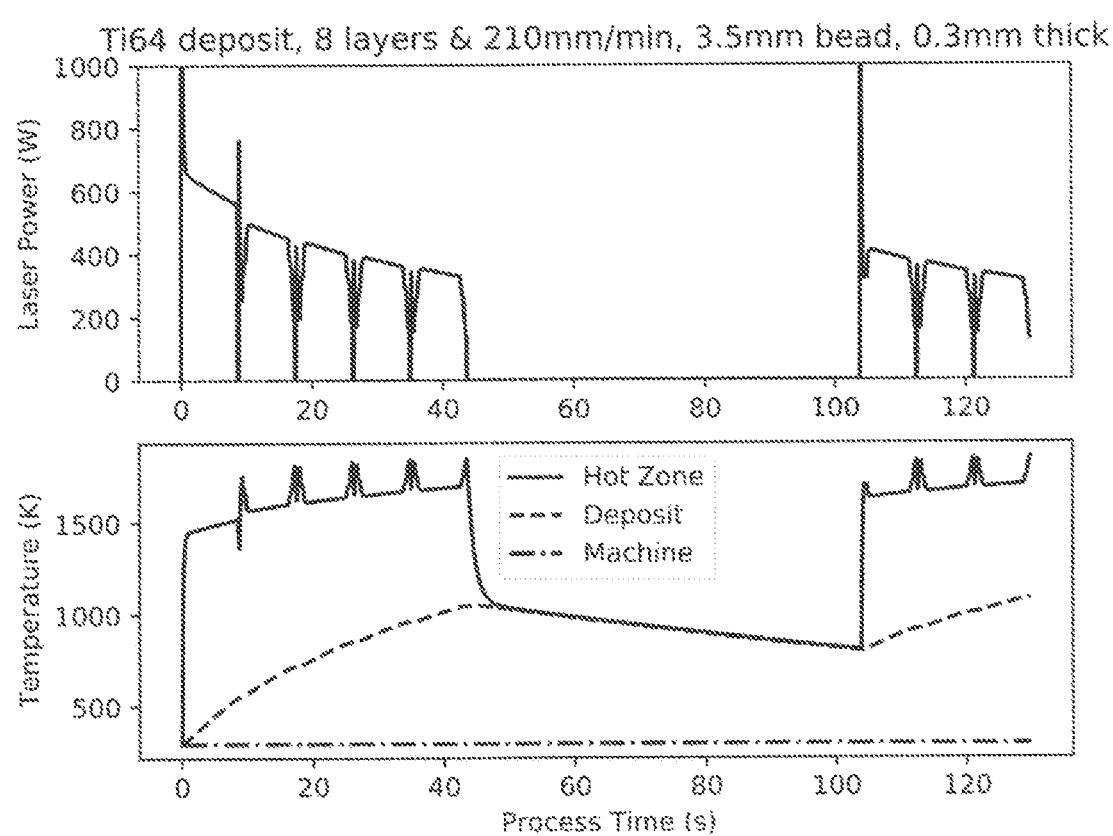
FIG. 2C depicts juxtaposed graphs showing predicted needed laser power and temperatures of the hot zone, deposit and machine environment over time for an additive metal deposition process used to build the wall structure of FIG. 2A when determined according to the present invention method. The predicted needed laser power is calculated at various intervals along the additive path process according to a time and event based calculation technique.

Of note, the present invention laser power prediction method can be compared to the prior art method. FIG. 2C depicts juxtaposed graphs showing improved predicted needed laser power and temperatures of the hot zone, deposit and machine environment over time for an additive metal deposition process used to build the wall structure of FIG. 2A when determined according to the present invention method. The predicted needed laser power is calculated at various intervals along the additive path process according to a time and event based calculation technique. By comparing the graph of FIG. 2B to the graph of FIG. 2C one can see that for the simplified structure of FIG. 2A, the initial predicted power levels are similar. Again, note that the predicted laser power requirement has a periodic component superpositioned with an exponential decay component. The periodic component is due to the hack-and-forth motion caused by the shape of the desired geometry. The exponential decay component is a result of the part and workpiece heading towards some steady state temperature. Note, however, as shown in FIG. 2C, when event time-based interruptions are taken into account, the predicted power levels and temperatures of the system components drop at certain points.

Figure 3A:
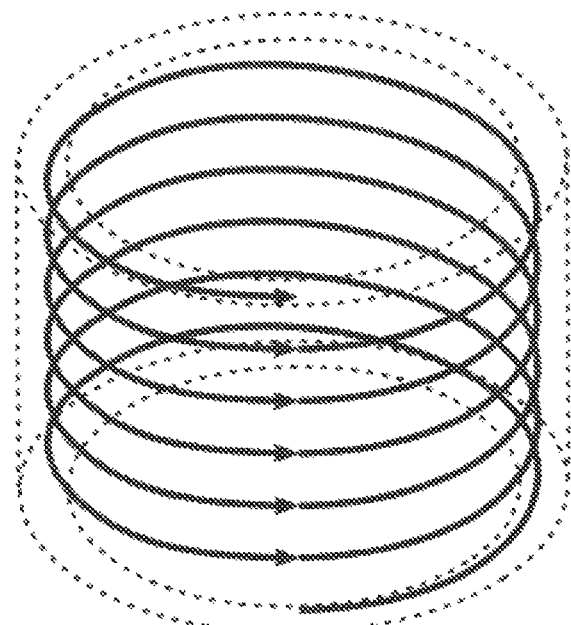
FIG. 3A depicts a simplified deposition path utilized when building a cylindrical-shaped structure using additive laser deposition.
Figure 3B:
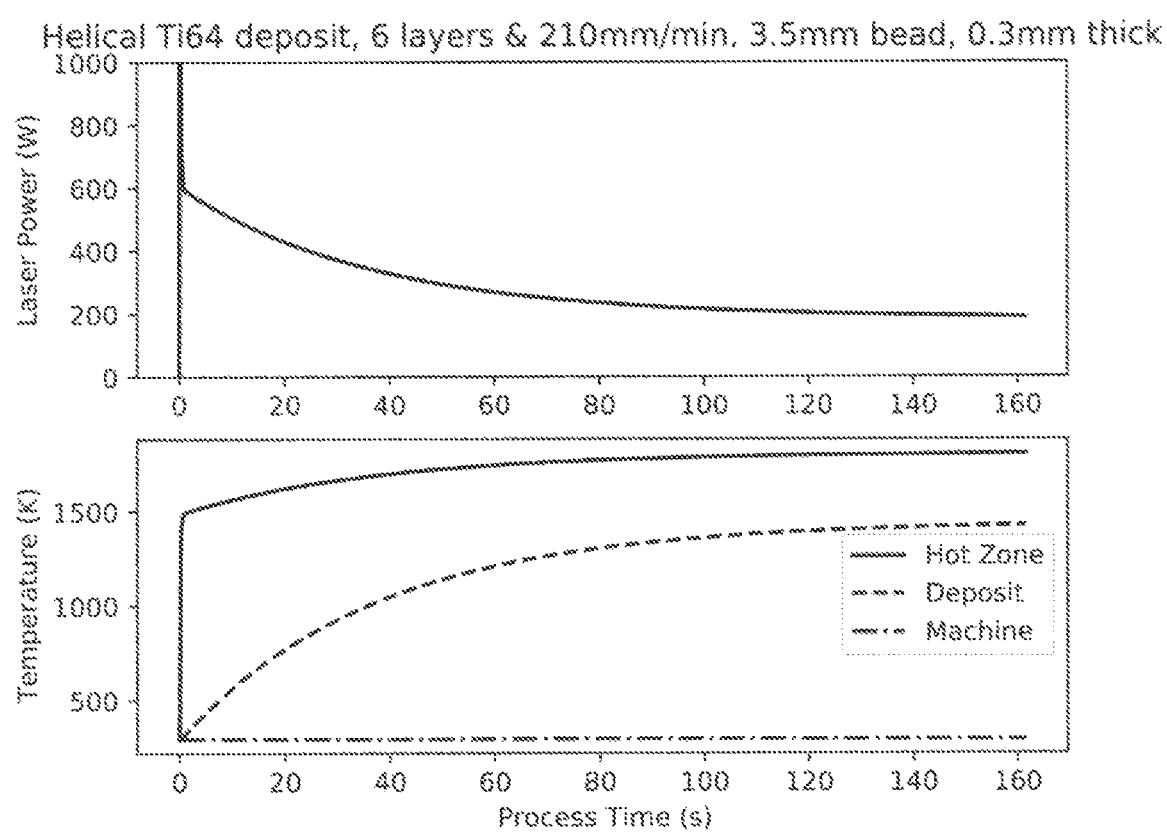
FIG. 3B depicts juxtaposed graphs showing predicted needed laser power and temperatures of the hot zone, deposit and machine environment over time for an additive metal deposition process used to build the cylindrical structure of FIG. 3A when determined according to the prior art predictive method.

FIG. 3A depicts a simplified deposition path utilized when building a cylindrical-shaped structure using additive laser deposition. The helical path for creating a cylinder as seen in FIG. 3A is as close to a steady state process as metal additive manufacturing will ever get. This is one of the reasons that a hollow cylindrical boss is a common demonstration structure for new metal additive manufacturing systems. FIG. 3B depicts juxtaposed graphs showing predicted needed laser power and temperatures of the hot zone, deposit and machine environment over time for an additive metal deposition process used to build the cylinder structure of FIG. 3A when determined according to the prior art predictive method. The predicted power shown in top graph of FIG. 3B is very stable compared to the case described in FIG. 2B. This is because the helical path shown in FIG. 3A is much closer to a steady state than the raster path used in the rectangular solid of FIG. 2A.

Figure 3C:
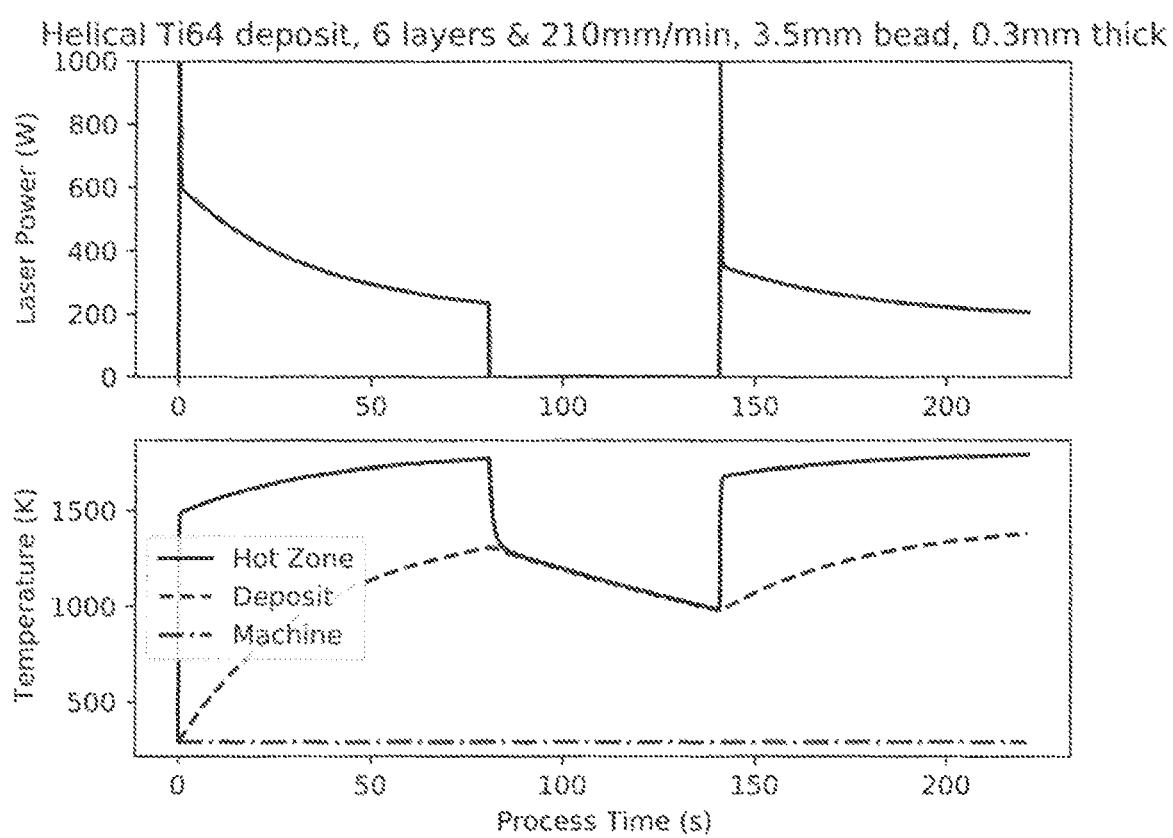
FIG. 3C depicts juxtaposed graphs showing predicted needed laser power and temperatures of the hot zone, deposit and machine environment over time for an additive metal deposition process used to build the cylindrical structure of FIG. 3A when determined according to the present invention method. The predicted needed laser power is calculated at various intervals along the additive path process according to a time and event based calculation technique.

FIG. 3C depicts juxtaposed graphs showing predicted needed laser power and temperatures of the hot zone, deposit and machine environment over time for an additive metal deposition process used to build the cylinder structure of FIG. 3A when determined according to the present invention method. The predicted needed laser power is calculated at various intervals along the additive path process according to a time and event based calculation technique. By comparing the graph of FIG. 3C to the graph of FIG. 3B one can see that for the cylindrical structure of FIG. 3A, the predicted power levels are similar at the beginning of the process, but deviate significantly when event interruptions are factored in. With the current prediction method the needed power input is computed to stabilize discretely and not gradually.

Using the calculations above, the laser energy delivered during an additive path deposition process can be controlled on a time basis for each point along the path by regulating power to the laser at each point in accordance with the required power predicted by the above calculation methods. An embodiment of the inventive method can be programmed into a computer-controlled laser metal deposition system to improve the fabrication of components of almost any geometry that can be produced from a computer database. This system for fabricating a part on a substrate using a deposition beam source that follows an additive path is depicted in FIG. 4.

Figure 4:
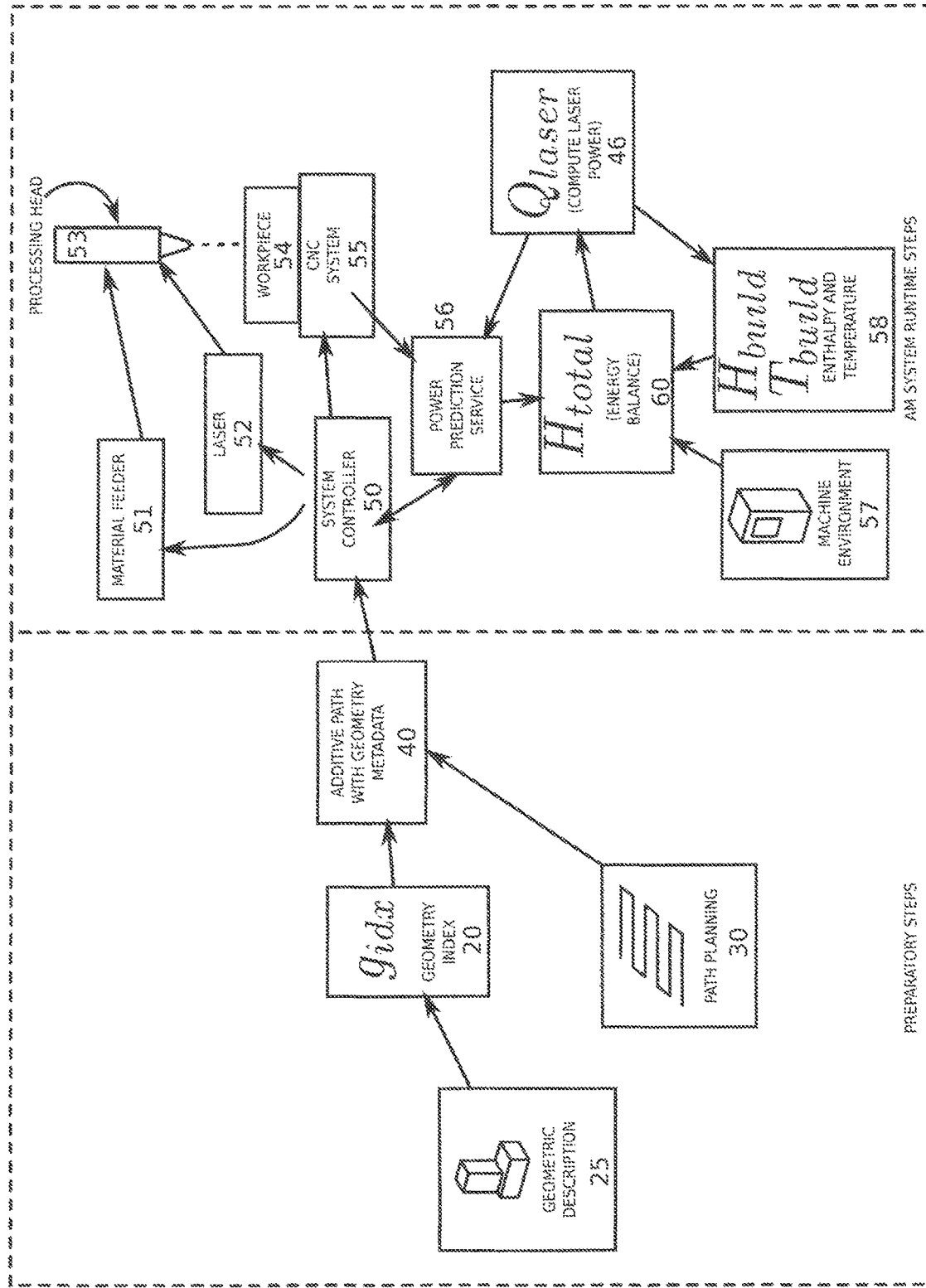
FIG. 4 is a schematic diagram of a preferred embodiment system for fabricating a part on a substrate using a deposition beam source that follows an additive path and that is controlled in accordance with the two-part laser power prediction method of the present invention.

In the depicted system, the pre-processing steps leading to the calculation of the additive-path-with-geometry-metadata 40 (discussed in more detail infra) are shown in the left side panel of FIG. 4. Additive-path-with-geometry-metadata 40 is input into system controller 50 for use in controlling the additive manufacturing process during operation. The system includes a substrate support (CNC system or table) 55 for supporting the workpiece (substrate) 54 and manipulating it through space, a material feeder 51 (a metal stock delivery system such as a powdered metal injector/sprayer or wire feeder) and a laser 52, both of which are typically found in a processing head 53. Laser 52, system controller 50 and processing head 53 work together to emit a beam (dotted line impacting workpiece) onto workpiece 54 and form a melt pool thereon and control power to the beam source, System controller 50 is programmed to regulate energy of the produced beam for any point on the additive path in accordance with the required power predicted by power prediction service component 56.

Figure 5:
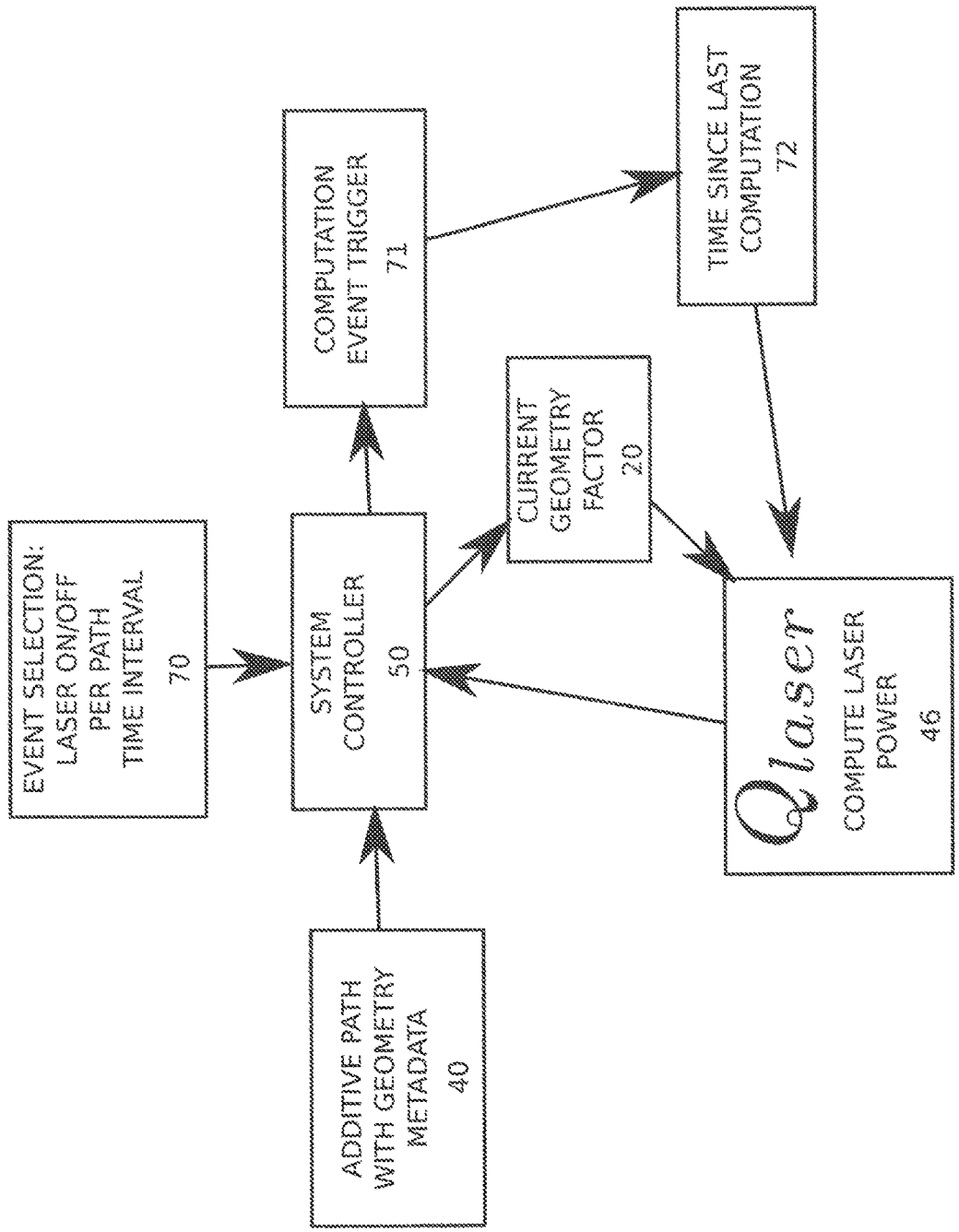
FIG. 5 is a flow chart of an embodiment of the overall, two-component method for controlling beam power according to the present invention predictive technique.

System controller 50 regulates power to laser 52 for each point on the additive path as a function of preprocessing data 40 and the other input data shown in FIGS. 4 and 5. As shown in the right panel of FIG. 4, the system calculates $H_{total}$ 60 using enthalpy ($H_{build}$) and temperature ($T_{build}$) data 58, machine environment data (data regarding ambient temperature, initial temperature of the build and other environmental conditions) 57 plus input from the power prediction service 56. That determined $H_{total}$ 60 is used to compute laser power ($Q_{laser}$) 46, which computation is fed back into the power prediction service 56 to input into the system controller 50. With that input along with the additive path and geometry metadata 40, the system controller sends control signals to the material feeder 51, laser 52 and CNC system 55. These inputs discussed hereafter are used to produce overall additive path and power data inputs for the system controller. As the deposition process is additive and the formula recursive, computed laser power 46 is also a data element that factors into enthalpy and temperature data 58.

As noted, the method described herein has certain components in common with the method of U.S. Pat. No. 9,573,224. In the prior art method the important geometry factor is computed according to that patent's equations nos. 11-12 and depicted in the method schematically shown in that patent's FIGS. 7A-7C. The geometry factor computing process was part of the in-process deposition process. In contrast, with the instant invention, there are now two separate, but interrelated processes and the geometry index determination component of the method, though still important to predicting laser power, is separated from the in process computations.

In one embodiment the invention is directed to a method of controlling beam power during an additive deposition process. FIG. 5 is a flow chart showing the intra-process component of beam power controlling method according to the present invention predictive technique. As shown in FIG. 5, system controller 50 uses event timing input 70 to determine a computation event trigger 71 which leads to a determination of time since the last power computation 72. That determination 72 along with the determined geometric index 20 for the point on the build in system controller 50 is used to compute a predicted laser power 46 for the point P(s) on the build. Computed laser power 46 and the additive-path-with-geometry-metadata 40 are input into system controller 50. System controller 50 then sends a power modulation signal to material feeder 51 and laser 52 of processing head 53. As can be appreciated, timing inputs of 70, 71 and 72 provide an indication to system controller as to where the additive process is timing-wise and thus a more accurate prediction of needed laser power. In other word, the additive-path-with-geometry-metadata plus the event selection inputs in system controller 50 is used by as a basis to determine when, as opposed to simply where, to do a beam power modulation calculation.

As shown in the figures, the deposition process is controlled by a system controller 50, The deposition process uses a beam source (laser) 52 to project energy to a point P(s) along an additive path that will be traveled to form a build. The build has a geometry and is formed from deposited material added to a structure. The point P(s) along the additive path has associated with it a geometry index (idealized geometry) that comprises a melt pool, a hot zone and a bulk portion. The method includes a pre-processing component and an intra-processing component.

The pre-processing component involves creating in the system controller a machine code expressed additive-path-with-geometry-metadata that includes a path description. The path description represents the path of the beam source through space during the additive process and includes the idealized geometry calculated for the point P(s) based upon a geometric description representing the geometry of the build during the additive process.

The intra-processing component comprises several calculations. The first calculation calculates an energy balance at the melt pool ($EB_{melt\ pool}$) for the point P(s) on the additive path. The energy balance calculation is based upon the following calculations: a) a calculation of energy radiated from the melt pool ($H_{rad}$); b) a calculation of energy conducted from the melt pool to the hot zone ($H_{cond}$), the calculation of $H_{cond}$ being based upon the additive-path-with-geometry metadata; and c) a calculation of energy lost due to convection at the melt pool ($H_{conv}$).

The second calculation calculates total energy ($H_{total}$) needed at the point P(s) on the additive path according to the following equation $$H_{total} = H_{deposited\ material} + H_{remelt} + EB_{melt\ pool}$$

wherein $H_{deposited\ material}$ represents energy required to melt the deposited material and $H_{remelt}$ represents energy required to remelt existing material.

The third calculation calculates optimum beam source power $Q_{source}$ for the point P(s) according to the following equation $$Q_{source} = \min(Q_{max}, H_{total}/\alpha \Delta t)$$

wherein $Q_{max}$ represent maximum laser power, $\alpha$ represents a beam absorption coefficient and $\Delta t$ represents a calculation interval (the time between recomputing laser power).

The energy projected by the beam source is modulated based upon the calculated optimum beam source power $Q_{source}$.

The additive-path-with-geometry-metadata can be created in alternative ways. These alternative methods are depicted in FIGS. 6A through 6C. The first method (referred to as the "detailed method") is shown in FIG. 6A. This figure describes the creation of the geometry index, which is basically the volume fraction of the hemispheres seen in FIG. 1 that intersect the part. The creation of a geometry index is part of the original laser power prediction method. However, in the present invention, what was an intermediary value in the original predictive method is now the final number of interest to be included with the path plan data in lieu of the laser power. According to FIG. 6A, path planning data 30 and inspection interval data 11 (distance along the path between recomputing the geometry index) are used as inputs to determine a point along the path data 12, Hot zone radius data 13 and point along the path data 12 are used to calculate hot zone hemisphere data 14. That hot zone hemisphere data 14 along with the input geometry 10 of the build are used to determine an intersect hot zone hemisphere with input geometry value 15. The determined intersect hot zone hemisphere with input geometry value 15 yields geometric description 25. In the case of FIG. 6A the geometric description is labeled as 25A and is a determined intersection to hot zone hemisphere ratio. That ratio yields a geometry index (a/k/a geometry factor) $g_{idx}$ 20. The geometry index 20 and the path planning data 30 are combined to create "additive-path-with-geometry-metadata" 40, which will be expressed in machine code for configuration in the system controller. Due to the reliance on boolean operations to compute the intersection, the metadata creation can be computationally expensive. Thus, applicant has devised the two alternate levels of approximation in FIGS. 6B and 6C.

In a second method (referred to as the "geometry case method") shown in FIG. 6B path planning data 30 and inspection interval data 11 are used as inputs to determine a point along path data 12. That point along path data 12 along with the input geometry 10 of the build are used to determine a geometric description (in this case a geometry case referable to the particular structure; edge, corner, infill, overhang) 25B for the subject point along the path, which yields a geometry index (a/k/a geometry factor) $g_{idx}$ 20. The geometry index 20 and the path planning data 30 are combined to create "additive-path-with-geometry-metadata" 40, which will be expressed in machine code for configuration in the system controller. With the method of FIG. 6B, the geometry index value can be chosen categorically based on a case-based approach. In this respect, a corner may have set value and a point on a long edge would have another value. This is tenable via a signed distance function for the model, which is more expensive than a single boolean operation, but only needs to he done once. After computation, one can sample the field generated via the signed distance function (i.e. a big voxel domain in which each voxel contains the nearest distance to the surface of the part) to determine the case.

In a third method (referred to as the "path case method") shown in FIG. 6C, path planning data 30 is used to determine a geometric description in the form of a path type 25C on the build (e.g., perimeter, infill) for the subject point under processing. That path type 25C information yields a geometry index (a/k/a geometry factor) $g_{idx}$ 20 for the point. The geometry index 20 and the path planning data 30 are combined to create "additive-path-with-geometry-metadata" 40, which will be expressed in machine code for configuration in the system controller. The method of FIG. 6C is the simplest geometry index estimation. This method involves skipping analyzing the model in its entirety. A value is assigned based on the type of path in the path plan. For example, it is already known whether the path is on the perimeter or in the interior based on metadata already within the path plan because this information is needed for path sorting algorithms in other areas of my CAM tools. Assigning geometry index values based on this method is essentially "free" in a computational sense. In testing, the method proved to be acceptable, but less reactive to changes in geometry. On the other hand, the method of FIG. 6A will be the most reactive to what is actually being built. However, if the part being built is small, faster estimates are more than acceptable. For example, the method of FIG. 6C can be used to create a multitude of small parts on a plate for some characterization of a material.

The invention is further directed to a method of controlling beam power during an additive deposition process that is controlled by a system controller and that employs a beam source. The method uses a power schedule calculation that calculates optimum beam power for any point P(s) along an additive path that will be traveled to form a build. The build has a geometry and is formed from deposited material added to a structure. The point P(s) along the additive path has associated with it an idealized geometry comprising a melt pool, hot zone and bulk portion. The method comprises a pre-processing component and an intra-processing component.

The pre-processing component of the method involves creating in the system controller a machine code expressed additive-path-with-geometry-metadata that includes a path description. The path description: a) represents the path of the beam source through space during the additive process; and b) includes the idealized geometry calculated for the point P(s) based upon a geometric description representing the geometry of the build during the additive process.

The intra-processing component involves:

calculating the temperature of the build at the point P(s) during the additive process, the calculation of the temperature of the build includes a calculation of hot zone temperature based upon additive-path-with-geometry-metadata;

calculating an energy loss of the build at point P(s) during the additive process, the calculation of energy loss being based upon the calculation of temperature and including a calculation of energy conducted from the melt pool to the hot zone;

calculating an enthalpy of the build at point P(s) in time during the additive process;

calculating total energy needed at the point P(s) based upon the calculated energy loss and enthalpy of the build at point P(s) on the additive path;

calculating an optimum beam source power based upon the calculation of total energy needed at point P(s) during the additive process; and modulating the power of the beam emitted by the beam source at point P(s) of the additive path in accordance with the optimum beam source power calculated for point P(s).

The invention is also directed to a system for fabricating a part on a substrate using a deposition beam source that emits a beam that follows an additive path composed of a plurality of points. The system comprises a substrate support for supporting the substrate and manipulating it through space. The system further includes a metal stock delivery system and a controllable beam source capable of emitting a beam onto the substrate and adapted to form a melt pool thereon. The system also includes a system controller that has machine code containing the additive-path-with-geometry-metadata described above and that controls power to the beam source. The system controller is programmed to regulate energy of the produced beam for any point on the additive path in accordance with the machine code and the required power predicted by the intra-processing component via any of the methods described above.

The live computation from a runtime-derived timing allows for the double checking of results via feedback. In this respect sensors such as spectrometers, welding cameras (for welding applications) or a 3D scanning system could be integrated into the system and method. A spectrometer, for instance, can be used to detect the emission spectra from the melt pool and hot zone regions. A neural network could be added to predict model errors or process problems using a spectrometer and camera.

The process described herein can also be used in connection with other traditional welding techniques, such as tungsten inert gas ("TIG") welding, gas metal arc welding ("GMAW"), plasma transferred arc ("PTA") welding and electron beam ("EB") welding. While the embodiments of the method and system of the present invention have been described herein, numerous modifications, alterations and changes to the described embodiments are possible without departing from the scope of the invention. The embodiments described herein are not intended to be limiting.

What is claimed is:

1. A method of controlling beam power during an additive deposition process that is controlled by a system controller and that uses a beam source to project energy to a point P(s) along an additive path that will be traveled to form a build, the build having a geometry and being formed from deposited material added to a structure, the method comprising:
   a pre-processing component and an intra-processing component;
   the pre-processing component comprising creating in the system controller a machine code expressed additive-path-with-geometry-metadata, the additive-path-with-geometry-metadata including: a) a path description, the path description representing the path of the beam source through space during the additive process; and b) a geometry index determined for the point P(s) based upon a geometric description representing the geometry of the build during the additive process, the geometry index comprising predicted thermal characteristics as to a determined melt pool, hot zone and bulk portion for the point P(s);
   the intra-processing component comprising at a selected time:
   1) calculating an energy balance at the melt pool ($EB_{melt\ pool}$) for the point P(s) on the additive path, the energy balance calculation being based upon the following calculations:
      a) a calculation of energy radiated from the melt pool ($H_{rad}$);
      b) a calculation of energy conducted from the melt pool to the hot zone ($H_{cond}$), the calculation of $H_{cond}$ being based upon the additive-path-with-geometry-metadata and
      c) a calculation of energy lost due to convection at the melt pool ($H_{conv}$);
   2) calculating total energy ($H_{total}$) needed at the point P(s) on the additive path according to the following equation $$H_{total}=H_{deposited\ material}+H_{remelt}+EB_{melt\ pool}$$

wherein $H_{deposited\ material}$ represents energy required to melt the deposited material and $H_{remelt}$ it represents energy required to remelt existing material;

3) calculating optimum beam source power $Q_{source}$ for the point P(s) according to the following equation $$Q_{source}=\min(Q_{max},H_{total}/\alpha\Delta t)$$

wherein $Q_{max}$ represent maximum laser power, $\alpha$ represents a beam absorption coefficient and $\Delta t$ represents a calculation interval between laser power computations;
   the selected time being the occurrence of a defined event during the additive deposition process or the beam source arriving at a selected point on the additive path during the additive deposition process; and
   modulating the energy projected by the beam source based upon the calculated optimum beam source power $Q_{source}$.

2. The method of claim 1 wherein the geometry index is determined by a geometry index calculation, the geometry index calculation including:
   calculating a geometry index hot zone volume ($V_{hot}$) for the point P(s) on the additive path according to the formula $$V_{hot}=G\cap Z(r_{hot},P(s),\hat{t}(s))$$

wherein G represents deposition geometry, Z represents a hemisphere of a certain radius (r) and having a circular surface centered at a point P(s) on the additive path with a normal direction ($\hat{n}$), $r_{hot}$ represents the radius of the hot zone and $\hat{t}(s)$ represents tool axis direction at a distance s along the additive path; and
   calculating a geometry index hot zone area ($A_{hot}$) for the point P(s) on the additive path based upon the calculated geometry index hot zone volume ($V_{hot}$) according to the formula $$A_{hot}=V_{hot}A_{max}/V_{max}$$

wherein $A_{max}$ represents the maximum area of the hot zone and $V_{max}$ represents the maximum volume of the hot zone.

3. The method of claim 2 wherein calculating $EB_{melt\ pool}$ is performed according to the formula $$EB_{melt\ pool}=H_{rad}+H_{cond}+H_{conv}.$$

4. The method of claim 1 wherein the geometry index is:
   a) based upon a determined geometry case, the geometry case being based upon the geometric description and a point-along-path-data element, the point-along-path-data element being based upon the path description and the selected time; and
   b) not based upon a calculated hot zone radius.

5. The method of claim 1 wherein the geometry index is:
   a) based upon a pre-determined value for a path type description for the point P(s) that is based upon the path description; and
   b) not based upon a calculated hot zone radius.

6. A system, implementing the method of claim 1, for fabricating a part on a substrate using a deposition beam source that emits a beam that follows an additive path composed of a plurality of points, the system comprising:
   a substrate support for supporting the substrate and manipulating it through space;
   a metal stock delivery system;
   a controllable beam source capable of emitting a beam onto the substrate and adapted to form a melt pool thereon; and
   a system controller including machine code containing the additive-path-with-geometry-metadata and controlling power to the beam source, the system controller programmed to regulate energy of the produced beam for any point on the additive path in accordance with the machine code and the required power predicted by the intra-processing component.

7. A system, implementing the method of claim 2, for fabricating a part on a substrate using a deposition beam source that emits a beam that follows an additive path composed of a plurality of points, the system comprising:
   a substrate support for supporting the substrate and manipulating it through space;
   a metal stock delivery system;
   a controllable beam source capable of emitting a beam onto the substrate and adapted to form a melt pool thereon; and
   a system controller including machine code containing the additive-path-with-geometry-metadata and controlling power to the beam source, the system controller programmed to regulate energy of the produced beam for any point on the additive path in accordance with the machine code and the required power predicted by the intra-processing component.

8. A system, implementing the method of claim 4, for fabricating a part on a substrate using a deposition beam source that emits a beam that follows an additive path composed of a plurality of points, the system comprising:
   a substrate support for supporting the substrate and manipulating it through space;
   a metal stock delivery system;
   a controllable beam source capable of emitting a beam onto the substrate and adapted to form a melt pool thereon; and
   a system controller including machine code containing the additive-path-with-geometry-metadata and controlling power to the beam source, the system controller programmed to regulate energy of the produced beam for any point on the additive path in accordance with the machine code and the required power predicted by the intra-processing component.

9. A system, implementing the method of claim 5, for fabricating a part on a substrate using a deposition beam source that emits a beam that follows an additive path composed of a plurality of points, the system comprising:
   a substrate support for supporting the substrate and manipulating it through space;
   a metal stock delivery system;
   a controllable beam source capable of emitting a beam onto the substrate and adapted to form a melt pool thereon; and
   a system controller including machine code containing the additive-path-with-geometry-metadata and controlling power to the beam source, the system controller programmed to regulate energy of the produced beam for any point on the additive path in accordance with the machine code and the required power predicted by the intra-processing component.

10. A method of controlling beam power during an additive deposition process that is controlled by a system controller and that employs a beam source using a power schedule calculation that calculates optimum beam power for any point P(s) along an additive path that will be traveled to form a build, the build having a geometry and being formed from deposited material added to a structure, the method comprising:
    a pre-processing component and an intra-processing component;
    during the pre-processing component creating in the system controller a machine code expressed additive-path-with-geometry-metadata that includes a path description, the path description: a) representing the path of the beam source through space during the additive process; and b) including the geometry index calculated for the point P(s) based upon a geometric description representing the geometry of the build during the additive process, the geometry index comprising predicted thermal characteristics as to a determined melt pool, hot zone and bulk portion for the point P(s);
    during the intra-processing component calculating at a selected time:
    a) the temperature of the build at point P(s) during the additive process, the calculation of the temperature of the build including a calculation of hot zone temperature based upon additive-path-with-geometry-metadata;
    an energy loss of the build at point P(s) during the additive process, the calculation of energy loss being based upon the calculation of temperature and including a calculation of energy conducted from the melt pool to the hot zone;
    an enthalpy of the build at point P(s) during the additive process;
    total energy needed at the point P(s) based upon the calculated energy loss and enthalpy of the build at point P(s) on the additive path;
    an optimum beam source power based upon the calculation of total energy needed at point P(s) during the additive process;
    the selected time being the occurrence of a defined event during the additive deposition process or the passage of a selected time interval during the additive deposition process; and
    modulating the power of the beam emitted by the beam source at point P(s) of the additive path in accordance with the optimum beam source power calculated for point P(s).

11. The method of claim 10 wherein the geometry index is determined by an geometry index calculation, the geometry index calculation including:
    calculating a geometry index hot zone volume $V_{hot}$) for the point P(s) on the additive path according to the formula $$V_{hot}=G \cap Z(r_{hot},P(s),\hat{t}(s))$$

wherein G represents deposition geometry, Z represents a hemisphere of a certain radius (r) and having a circular surface centered at a point P(s) on the additive path with a normal direction ($\hat{n}$), $r_{hot}$ represents the radius of the hot zone and $\hat{t}(s)$ represents tool axis direction at a distance s along the additive path; and
    calculating a geometry index hot zone area ($A_{hot}$) for the point P(s) on the additive path based upon the calculated geometry index hot zone volume ($V_{hot}$) according to the formula $$A_{hot}=V_{hot}A_{max}/V_{max}$$

wherein $A_{max}$ represents the maximum area of the hot zone and $V_{max}$ represents the maximum volume of the hot zone.

12. The method of claim 10 wherein the geometry index is:
    a) based upon a determined geometry case, the geometry case being based upon the geometric description and a point-along-path-data element, the point-along-path-data element being based upon the path description and the selected time; and
    b) not based upon a calculated hot zone radius.

13. The method of claim 10 wherein the geometry index is:
  a) based upon a pre-determined value for a path type description for the point P(s) that is based upon the path description; and
  b) not based upon a calculated hot zone radius.

14. A system, implementing the method of claim 10, for fabricating a part on a substrate using a deposition beam source that emits a beam that follows an additive path composed of a plurality of points, the system comprising:
  a substrate support for supporting the substrate and manipulating it through space;
  a metal stock delivery system;
  a controllable beam source capable of emitting a beam onto the substrate and adapted to form a melt pool thereon; and
  a system controller including machine code containing the additive-path-with-geometry-metadata and controlling power to the beam source, the system controller programmed to regulate energy of the produced beam for any point on the additive path in accordance with the machine code and the required power predicted by the intra-processing component.

15. A system, implementing the method of claim 11, for fabricating a part on a substrate using a deposition beam source that emits a beam that follows an additive path composed of a plurality of points, the system comprising:
  a substrate support for supporting the substrate and manipulating it through space;
  a metal stock delivery system;
  a controllable beam source capable of emitting a beam onto the substrate and adapted to form a melt pool thereon; and
  a system controller including machine code containing the additive-path-with-geometry-metadata and controlling power to the beam source, the system controller programmed to regulate energy of the produced beam for any point on the additive path in accordance with the machine code and the required power predicted by the intra-processing component.

16. A system, implementing the method of claim 12, for fabricating a part on a substrate using a deposition beam source that emits a beam that follows an additive path composed of a plurality of points, the system comprising:
  a substrate support for supporting the substrate and manipulating it through space;
  a metal stock delivery system;
  a controllable beam source capable of emitting a beam onto the substrate and adapted to form a melt pool thereon; and
  a system controller including machine code containing the additive-path-with-geometry-metadata and controlling power to the beam source, the system controller programmed to regulate energy of the produced beam for any point on the additive path in accordance with the machine code and the required power predicted by the intra-processing component.

17. A system, implementing the method of claim 13, for fabricating a part on a substrate using a deposition beam source that emits a beam that follows an additive path composed of a plurality of points, the system comprising:
  a substrate support for supporting the substrate and manipulating it through space;
  a metal stock delivery system;
  a controllable beam source capable of emitting a beam onto the substrate and adapted to form a melt pool thereon; and
  a system controller including machine code containing the additive-path-with-geometry-metadata and controlling power to the beam source, the system controller programmed to regulate energy of the produced beam for any point on the additive path in accordance with the machine code and the required power predicted by the intra-processing component.

* * * * *